United States Patent [19]

Schulman et al.

[11] Patent Number: 4,784,476

[45] Date of Patent: Nov. 15, 1988

[54] NIPI REFRACTIVE INDEX MODULATION APPARATUS AND METHOD

[75] Inventors: Joel N. Schulman, Agoura; Uzi Efron, Los Angeles, both of Calif.

[73] Assignee: Hughes Aircraft Company, Los Angeles, Calif.

[21] Appl. No.: 7,298

[22] Filed: Jan. 27, 1987

[51] Int. Cl.⁴ .................... G02F 1/01; G02F 1/03; H01L 27/12; H01L 45/00

[52] U.S. Cl. .................... 350/355; 350/356; 350/393; 357/4; 355/71

[58] Field of Search .......... 350/354, 355, 356, 393; 332/7.51; 357/4; 355/71

[56] References Cited

U.S. PATENT DOCUMENTS

| | | | |
|---|---|---|---|
| 3,824,002 | 7/1974 | Beard | 350/342 |
| 4,019,807 | 4/1977 | Boswell et al. | 350/342 |
| 4,239,385 | 12/1980 | Hujer | 355/71 |
| 4,525,687 | 6/1985 | Chemla et al. | 332/7.51 |
| 4,549,788 | 10/1985 | Chemla | 350/354 |
| 4,597,638 | 7/1986 | Chemla et al. | 350/354 |
| 4,619,501 | 10/1986 | Armitage | 350/386 |

FOREIGN PATENT DOCUMENTS

WO86/0598 9/1986 World Int. Prop. O. .

OTHER PUBLICATIONS

T. H. Wood et al, "High-Speed Optical Modulation with GaAs/GaAlAs Quantum Wells in a p-i-n Diode Structure", 320 Applied Physics Letters, 44 (1984), Jan., No. 1, New York, pp. 16–18.

K. Ploog et al, "Compositional and Doping Superlattices in III-V Semiconductors", *Advances in Physics*, vol. 32, No. 3, 1983, pp. 285–359.

Dohler et al, "The Potential of n-i-p-i Doping Superlattices for Novel Semiconductor Devices", *Superlattices and Micro-Structures*, vol. 1, No. 3 (1985), pp. 279–287.

Dohler et al, "Light Generation, Modulation, and Amplification by n-i-p-i Doping Superlattices", *Optical Engineering*, vol. 25, No. 2, Feb. 1986, pp. 211–218.

Ploog et al, "Simultaneous Modulation of Electron and Hole Conductivity in a New Periodic GaAs Doping Multilayer Structure", *Applied Physics Letters*, vol. 38, No. 11, 1981, pp. 870–873, Jun. 1981.

S. M. Sze, *Physics of Semiconductor Devices*, Wiley Interscience, Ed. 1981, pp. 766–783.

P. P. Ruden et al, "Low Power Non-Linear Optical Phenomena in Doping Superlattices", 17th International Conference on the Physics of Semiconductors, Springer Verlag, 1984, pp. 535–538.

K. B. Kahen et al, "Structure Variation of the Index of Refraction of GaAs-AlAs Superlattices and Multiple Quantum Wells", *Applied Physics Letters*, vol. 47, No. 5, Sep. 1985, pp. 508–510.

Y. Suzuki et al, "Refractive Index of GaAs-AlAs Superlattice Grown by MBE", J. of Electronic Materials, vol. 12, No. 2, 1983, pp. 397 to 411.

*Primary Examiner*—Eugene R. LaRoche
*Assistant Examiner*—Michael B. Shingleton
*Attorney, Agent, or Firm*—V. D. Duraiswamy; A. W. Karambelas

[57] ABSTRACT

Various optical modulation systems and methods are disclosed which are based upon modulating the refractive index of a nipi structure. The refractive index modulation is accomplished by applying a controlled voltage differential across the n-doped and p-doped layers of the structure. Staggered contacts to the layers are formed by conductive elements which extend through the structure. One of the elements establishes ohmic contacts with the n layers, and the other with the p-layers. When implemented as an optical spatial phase modulator, one of the nipi contacts is provided as a grid which divides the structure into a matrix of pixel elements, with the other contact comprising separate wires extending through each pixel. A spatial voltage pattern is applied to the pixel wires to inject charge into their corresponding layers, and thereby modulate the refractive indices of the pixels. This imposes a desired spatial phase modulation onto a readout beam transmitted through the nipi structure. Various guided wave applications are also disclosed in which a beam is transmitted through a nipi structure parallel to the n and p layers. The nipi sturcture is not divided into pixels, but rather has a common voltage differential between its n and p layers. The structure's refractive index is spatially modulated by varying this voltage differential, whereby the spatial voltage modulation is transferred onto the beam.

24 Claims, 3 Drawing Sheets

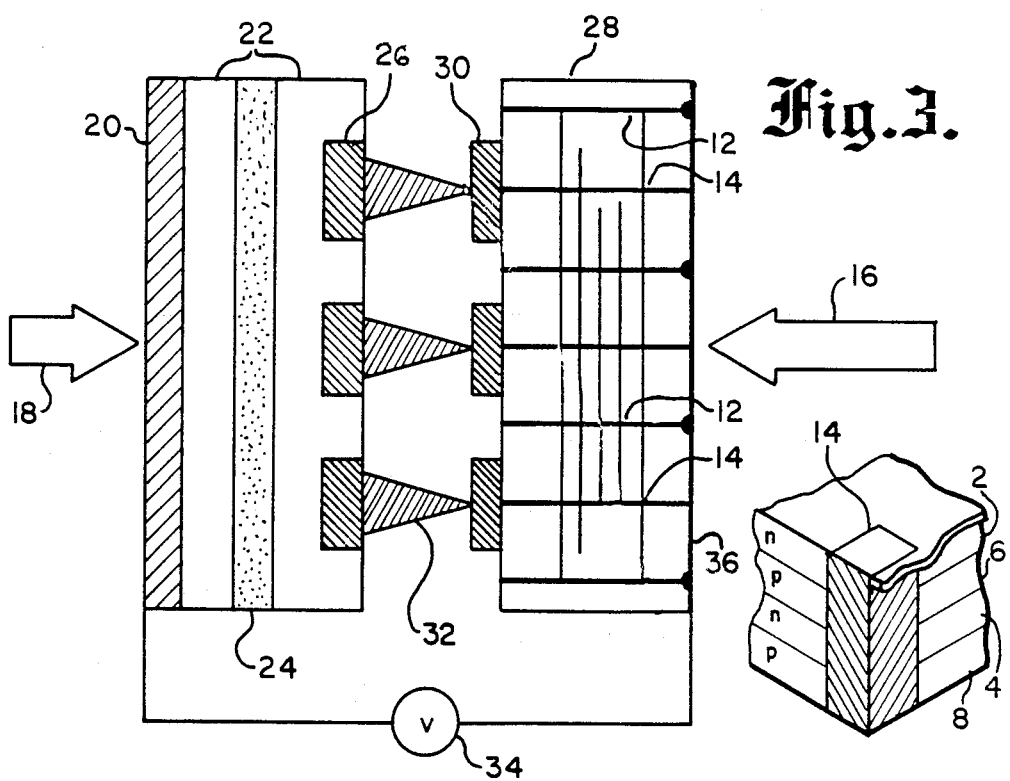
Fig.3.
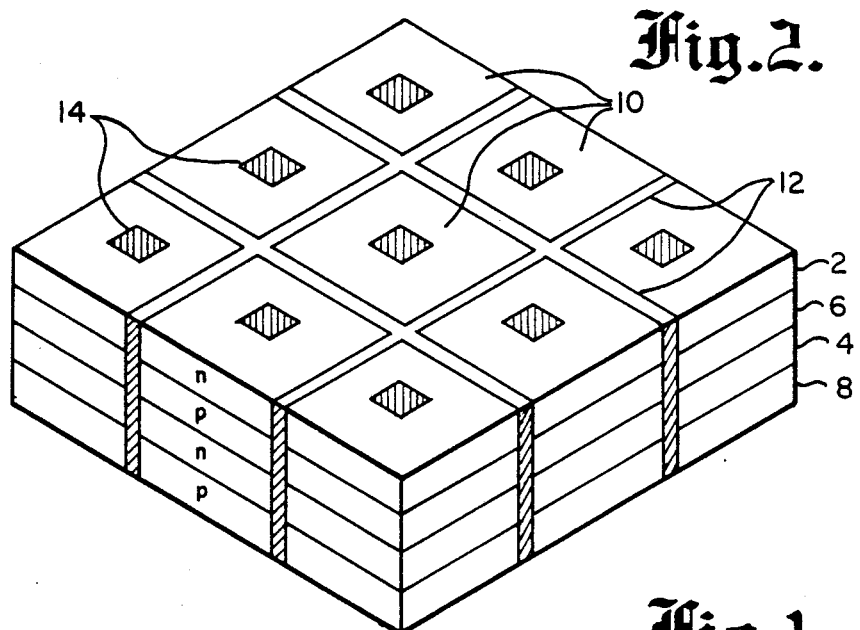
Fig.2.
Fig.1.

NIPI REFRACTIVE INDEX MODULATION APPARATUS AND METHOD

BACKGROUND OF THE INVENTION

1. Field of the Invention

This invention relates to apparatus and methods for refractive index modulation, with particular emphasis to the application of refractive index modulation to spatial phase modulation and other transfers of information to an optical beam.

2. Description of the Related Art

Numerous techniques are available which use an optical beam as an information-bearing medium (the term "optical" is intended in its broad sense as indicating both visible light, and electromagnetic radiation on either side of the visible light spectrum.) For example, a change in index of refraction will alter the speed at which light traverses a particular medium, and therefore can be used to introduce a phase shift into the light wavefront. Voltage controlled phase shifting of light is important in many opto-electronic applications. For example, in a spatial light modulator, a voltage-controlled modulation of the index of refraction may be used to cause constructive or destructive interference in a reflected optical beam, depending upon the voltage-controlled phase shift.

A common form of spatial light modulator is a liquid crystal light valve. The development and theory underlying light valve technology is illustrated in patents such as U.S. Pat. No. 3,824,002, issued to T. D. Beard on July 16, 1974, and U.S. Pat. No. 4,019,807, issued to D. D. Boswell et al. on Apr. 26, 1977. These patents are assigned to Hughes Aircraft Company, the assignee of the present invention. However, the liquid crystals used in these devices have response times on the order of milliseconds, making them unsuitable for higher speed applications in conjunction with high speed materials like GaAs. A higher speed modulation device would be very desirable for adaptive optics, optical processing applications and integrated optics.

Guided wave switching and modulation in integrated optics is another area in which a material with a variable refractive index can be used to apply information to an optical beam. Optical phase shifting for guided wave applications is done mainly with $LiNbO_3$ as the optical medium, but it is not easily integrated with high speed GaAs.

One type of structure that has been developed and proposed for various optical applications is a "nipi" doping superlattice. This type of device was originally proposed as a lamination of n- and p-doped semiconductor layers with intrinsic zones in between the layers (the layer sequence n-intrinsic-p-intrinsic has been popularly abbreviated to "nipi".) Studies have indicated that nipi structures can exhibit exotic properties that are shown by neither bulk crystals nor compositional superlattices. Although the experimental work and later theoretical studies have generally dealt with doping structures that do not contain intrinsic regions, the term "nipi" is generally understood as referring to the entire class of doping superlattices, with or without intrinsic regions.

The unusual electronic properties of nipi structures derive from the different nature of the superlattice potential, specifically the space charge potential of ionized impurities in the doping layers. This is in contrast to compositional superlattices, composed of laternating layers of different materials or compositions, in which the superlattice potential originates from the different bandgap values of their components. The space charge potential in the nipi doping superlattice modulates the band edges of the host material such that electrons and holes become spatially separated. This separation can be optimized by appropriate doping concentrations and layer thicknesses. As a result of the strong spatial separation, excess-carrier recombination lifetimes can be larger by many orders of magnitude than those in the host material. Large excess carrier concentrations can be achieved easily, either by relatively weak optical excitation or by low injection currents. The spatial separation between ionized donors and acceptors results in an alternating space charged potential. With increasing carrier concentration both the number of ionized donors and acceptors and the amplitude of the superlattice potential decreases while, at the same time, the effective bandgap increases. Associated with this tunability of the bandgap is a tunability of the recombination lifetime, owing to a lowering of the tunneling or thermal barriers for recombination.

The tunability of carrier concentration, bandgap and lifetimes may be inferred to give rise to a tunability of electron and hole conductivity, of the spectra for luminescence, stimulated emission and absorption, and of the refractive index.

A basic discussion of the nipi structure is given in an article by Klaus Ploog and Gottfried H. Dohler, "Compositional and Doping Superlattices in III–V Semiconductors", *Advances In Physics*, Vol. 32, No. 3, 1983, pages 285–359. This article presents a general discussion of nipi's, as well as the spatial control of optical absorption by a voltage pattern applied to the nipi. Other applications, such as in photoconductors, photodiodes, ultrafast photodetectors, light emitting devices and optical absorption modulators, are discussed in an article by Dohler, "The Potential of n-i-p-i Doping Superlattices For Novel Semiconductor Devices", *Superlattices and Microstructures*, Vol. 1, No. 3, 1985, pages 279–287. A further expansion on nipi applications is provided in another article by Dohler, "Light Generation, Modulation, and Amplification by n-i-p-i Doping Superlattices", *Optical Engineering*, Vol. 25, No. 2, February, 1986, pages 211–218.

While various applications for nipi structures have been postulated, there is not believed to be any prior art linkage between nipi's and spatial phase modulation, or guided wave switching and modulation. A faster, reliable technique for accomplishing these functions is still needed.

SUMMARY OF THE INVENTION

In view of the above problems associated with the related art, the purpose of the present invention is the provision of an optical refractive index modulation apparatus and method which is significantly faster than prior devices and methods, and is compatible with GaAs.

Another goal is the provision of a novel and improved optical spatial phase modulation device and method which employs a nipi structure.

Another purpose of the invention is to provide a novel and improved mechanism for electrically connecting the nipi layers of like kind together for the application of a modulating voltage differential, resulting in spatial modulation of the refractive index.

These and other objects are achieved with the present invention by providing an optical refractive index modulator in the form of a nipi structure having alternating n and p doped semiconductor layers. First and second contact elements establish ohmic contacts with the n and p layers, respectively, while different voltages levels are applied to the first and second contact means to establish a voltage differential which modulates the nipi refractive index. The contact elements extend through the nipi structure transverse to the n and p layers, with each element formed from a material that establishes an ohmic contact with its respective nipi layers, and blockinq contacts with the layers of opposite polarity. When implemented as an optical spatial phase modulator, the first contact element comprises a ring which encloses aligned pixel elements of the nipi layers, while the second contact element comprises a wire which extends through the nipi layers within the ring. A plurality of such rings extends through the nipi to form a grid which divides the nipi into a matrix of pixels, and respective wires extend through the nipi layers within each grid opening. A commond voltage is applied to the grid, while spatially modulated voltages are applied to the respective wires. The nipi spatially modulates the phase of a readout beam in accordance with the applied spatially modulated voltages.

Instead of a grid matrix with a wire throuyh each grid opening, the electrical contacts can be implemented as a single wire contact to each n layer, and another single wire contact to each p layer. In this case the nipi operates as a refractive index modulator to optical radiation which is directed parallel to its layers, as in a waveguide.

An aspect of this invention is the use of a selective contacting as a method of biasing to achieve refractive index modulation. This method results in a fundamentally different modulation mechanism then, for example, longitudinal or transversal field biasing previously used for near bandgap modulation.

Other objects and features of the invention will be apparent to those skilled in the art from the following detailed description of preferred embodiments, taken together with the accompanying drawings, in which:

DESCRIPTION OF THE DRAWINGS

FIG. 1 is a sectioned perspective view of a nipi structure adapted to be used in an optical spatial phase modulator in accordance with the invention;

FIG. 2 is a fragmentary sectional view of an electrical contact arrangement for the structure of FIG. 1;

FIG. 3 is a simplified sectional view of a spatial phase modulator accordance with the invention;

DETAILED DESCRIPTION OF PREFERRED EMBODIMENTS

Figure 4:
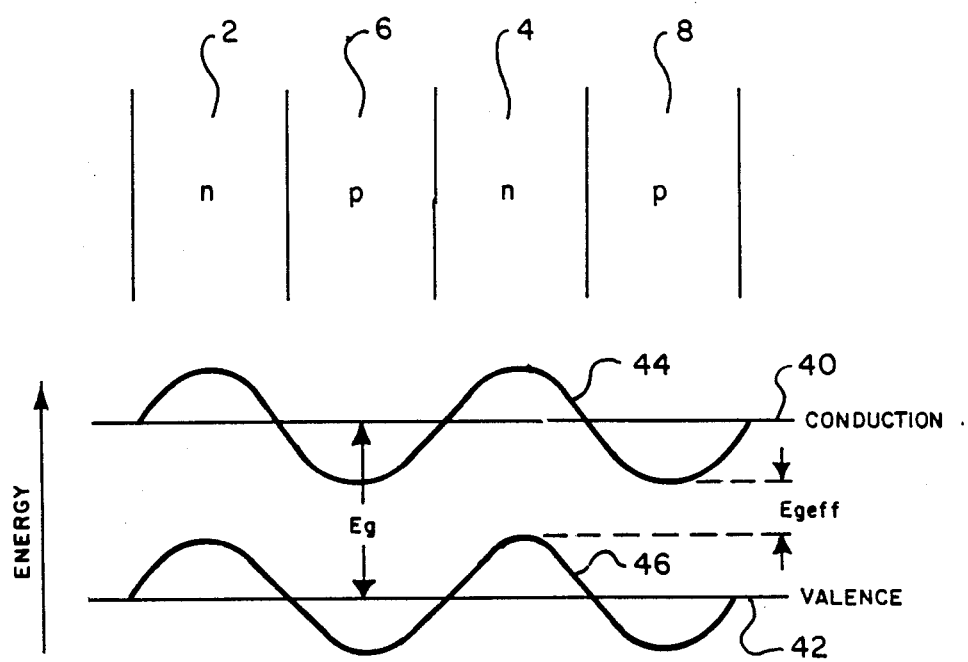
FIG. 4 is a diagram illustrating the bandgap energies of the nipi structure.

The present invention employs a nipi structure as a novel refractive index modulating mechanism for both spatial light modulation and guided wave applications. One aspect of the invention is an electrical feed arrangement which allows alternate layers of the nipi structure to be accessed by an external electric signal, whereby a common voltage differential can be established locally between adjacent pairs of n and p layers of each pixel. Although the invention is described herein in connection with exemplary embodiments in which the nipi structures have only n and p layers, the invention is also applicable to nipi structures having intrinsic layers between the n and p layers.

Referring first to FIG. 1, a simplified sectioned perspective view is provided of a nipi structure that has been specially adapted to function in a spatial light modulator. The nipi structure is illustrated as having two n layers 2, 4, which alternate with two p layers 6, 8. In actual practice, a typical nipi structure will have a total of about 200 layers, with 100 layers of each doping polarity. The thickness of the individual layers would typically be in the range of about 30–300 angstroms, with a doping level in the range of $10^{17}$–$10^{19}$ ions/cc. Preferably each of the n and p layers are equal in width and doping levels; if the layers are not equal in width, their doping levels should be adjusted inversely to their respective widths so that all layers have equal total dopings. An excess of holes or electrons within the overall nipi structure tends to degrade its performance. No claim of invention is made herein to the basic nipi structure, although its use to spatially modulate refractive index and the manner in which it is electrically accessed do form important parts of the invention.

The nipi structure is divided into a matrix of pixels 10, which extend down through the entire set of n and p layers. The pixels may be formed by fabricating the multilayer nipi structure on a substrate, etching away a grid of channels 12 which define and form square rings surrounding each pixel, and evaporating a contacting metal on the channels to contact the edge of each layer within each pixel. Although only nine pixels are illustrated, in practice a much higher concentration of pixels would be formed. Each pixel would typically be square and about 20 microns long on each side.

Within each pixel a separate contact is made to each of the underlying nipi layers by means of a metal wire 14 which extends down through the various nipi layers. As illustrated in FIG. 2, wire 14 is about 5 microns wide and makes a physical contact with each of the layers.

The materials used for the grid 12 and wires 14 are selected such that, although these elements make physical contact with each of the n and p layers, the grid will establish an ohmic (conducting) electrical contact only with the layers of one polarity, and an electrically blocking contact with the layers of opposite polarity. Conversely, wires 14 establish ohmic contacts with the layers which have blocking contacts with the grid, and blocking contacts with the layers which have ohmic contacts with the grid. In this manner an electric signal on wires 14 will be applied only to the layers of one polarity, while an electric signal on grid 12 will be applied only to the layers of opposite polarity. An example of a conductive material that will establish an ohmic contact with the n-doped layers and a blocking contact with the p-doped layers is tin. This characteristic of tin is mentioned in the 1983 Ploog and Dohler article in Advances in Physics, mentioned above. An example of a material that will establish an ohmic contact with the p-doped layers and a blocking contact with the n-doped layers is a zinc/-tin alloy, described in an article by Ploog, et al., "Simultaneous Modulation of Electron and Hole Conductivity in a New Periodic GaAs Doping Multilayer Structure", *Applied Physics Letters*, Vol. 38, 1981, page 870.

Thus, while grid 12 and wires 14 make physical contact with all of the n and p layers, the grid has an effective electrical contact only with the layers of one polarity, and the wires have an effective electrical contact only with the layers of opposite polarity. This allows a common voltage differential to be established between each successive pair of n and p layers in each pixel. Such a voltage pattern has been found to inject charge which alters the refractive index of the nipi structure for optical transmissions both parallel and transverse to the nipi layers. The change in refractive index varies in accordance with the degree of voltage differential, thus permitting the spatial modulation of an optical beam in response to refractive index variations in the nipi structure; these variations in turn are controlled by the pattern of an applied voltage signal. The information contained within the voltage signal is thereby translated into an optical modulation of the readout beam. The nipi structure can thus be used to provide efficient, very fast modulation with voltage levels which are compatible with high speed semiconductor devices.

FIG. 3 illustrates in simplified form an optical spatial phase modulator which modulates the phase of a readout beam 16 in accordance with the spatial intensity pattern of an input optical beam 18. The input beam is directed against a transparent electrode 20, preferably formed from indium-tin-oxide. Electrode 20 is formed on one face of a layer of photoconductor material 22, such as GaAs or silicon. Heavy doping is employed in selected areas of the photoconductor to provide an avalanche region 24 which adds an element of gain; otherwise, a very high level of input radiation could be necessary for proper operation. Avalanche amplification is discussed in S. M. Sze, "Physics of Semiconductor Devices", Wiley Interscience, Ed. 1981, pages 766–783.

A matrix of metal pads 26 are formed on the opposite side of the photoconductor from electrode 20. Pads 26 have the same pattern, and are aligned with, corresponding pixel elements of a nipi structure 28 which has the construction shown in FIG. 1. Corresponding conductive pads 30 are provided over the majority of the surface area for each pixel on nipi structure 28, in contact with respective pixel wires 14 but separated from grid 12. Metallic contacts 30 are evaporated onto the nipi structure, and are considerably larger in area than their corresponding wires 14.

Electrical contact is established between the photoconductor and the nipi structure by means of metal projections 32, preferably indium, which are formed on the photoconductor pad 16 and contact nipi pads 30 to inject current into wires 14. The metallic photoconductor pads 26 form Schottky contacts with the semiconductor extensions 32.

A voltage is applied across transparent electrode 20 and the opposite side of grid 12 by a voltage source 34, which is connected on one side to the electrode and on the side to a grid contact plate 36. Voltage source 34 may provide a dc voltage of up to 5 volts. An ac ripple may be desirable on top of the dc voltage to avoid degradation of the materials. The photoconductor 22 acts as an illumination intensity-to-voltage converter to provide a spatial voltage pattern for the nipi structure. The conductivity of the photoconductor 22 at any particular pixel location will vary in proportion to the intensity of the optical input beam for that pixel. For pixels with a low input intensity, the major portion of the voltage differential between electrode 20 and grid contact plate 36 will be established across the photoconductor for that pixel, with a much smaller voltage across the nipi structure of the same pixel. As the input optical intensity increases the photoconductor conductivity will also increase, transferring some of the voltage differential from the photoconductor to the nipi structure. Thus, for each pixel the photoconductor and nipi structure form a voltage divider which allocates the overall voltage differential in accordance with the input illumination.

Whereas the refractive index of a homogeneous semiconductor is generally the same, regardless of whether or not the semiconductor is doped, it has been previously noted that the refractive index of a nipi structure is significantly different than that for the same material in homogeneous form. P. P. Ruden and G. H. Dohler, "Low Power Non-Linear Optical Phenomena in Doping Superlattices", 17th International Conference on the Physics of Semiconductors, Springer Verlag 1984, page 535. In accordance with the invention, the refractive index of the nipi structure is spatially modulated, pixel-by-pixel, by modulating a forward bias across the p-n nipi layer junctions. The refractive index of the nipi varies as the forward bias increases, approaching that of a uniform material as the bias level increases. Thus, the refractive index of each pixel within the nipi structure is modulated in accordance with the bias across that pixel, which in turn is a function of the input optical intensity to the corresponding pixel in the photoconductor.

A spatial phase modulation is thus imposed upon the readout beam 16, which is transmitted through the nipi structure generally transverse to the nipi layers, and then reflected back through the structure. It should be understood that the readout beam will generally encompass the entire cross section of the nipi structure. Charge is injected through the semiconductor projections 32 and nipi pads 30 to the wires 14, causing a bias voltage to appear between the nipi layers which are ohmically contacted by the wires, and the layers electrically contacted by the grid structure. The grid is preferably maintained at a fixed reference voltage, which may be ground potential. Variations in the biasing potential modulate the space charge and the effective bandgap of the individual pixels, thus producing the desired spatial variation in the refractive index of the nipi array.

In addition to providing an interface between the nipi structure and photoconductor assembly, the nipi contact pads 30 reflect the readout beam back through the nipi structure. The beam is reflected off the pad surfaces which face the nipi array. This eliminates the need for a separate mirror on the surface of the nipi structure. If the photoconductor material is GaAs and the wavelength of the readout beam is greater than the characteristic photoconductor wavelength, the GaAs will not be excited by readout beam leakage between the nipi contact pads.

While the spatial phase modulator of FIG. 3 operates in response to the intensity profile of an input optical beam, other information bearing media could be used and transduced to the desired spatial voltage pattern for application to the nipi device. Thus, this aspect of the invention is not limited to an optical input, but rather can function with other input arrangements for generating a spatial voltage pattern. This would include electron beam devices, and charged coupled device (CCD) arrays.

Referring now to FIG. 4, the energy levels of the respective nipi layers 2, 4, 6 and 8 are illustrated. The energy levels of the conduction and valence bands for the nipi material are indicated by lines 40 and 42, respectively. The characteristic bandgap energy for the material is indicated as $E_g$. The effect of the alternating nipi structure upon the conduction and valence energies are indicated by oscillating lines 44 and 46, respectively. It can be seen that the energy level increases in the n-type layers and decreases in the p-type layers. As a result, the effective bandgap of the nipi structure ($E_{geff}$), which is equal to the difference between the minimum conduction and maximum valence energy levels, is less than $E_g$. For GaAs, $E_g$ is about 1.42 eV, whereas $E_{geff}$ can vary from 0 to 1.42 eV. Applying a forward bias to the p/n layers as described above decreases the variations in the conduction and valence energy levels, and thereby increases $E_{geff}$.

Figure 5:
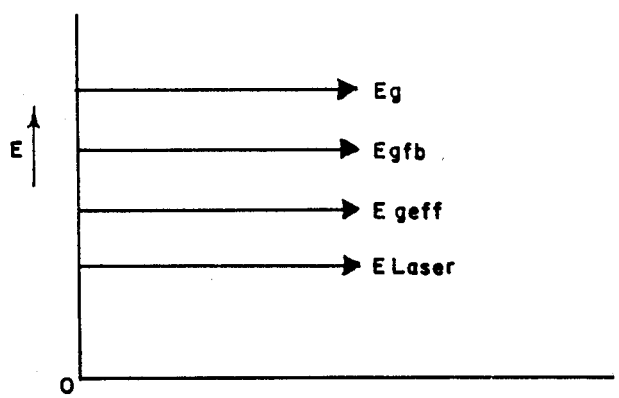
FIG. 5 is a diagram illustrating the desired energy relationship between the nipi structure and an input laser beam for the spatial phase modulator of FIG. 3.

FIG. 5 is a diagram illustrating the desired, but not essential, energy relationships between a readout laser beam, $E_{geff}$ without forward biasing, the nipi bandgap energy with forward biasing ($E_{gfb}$), and the bandgap energy $E_g$ of the homogeneous nipi material. With the laser energy less than $E_{geff}$ and $E_{gfb}$, the readout laser beam will not be absorbed in the nipi during either forward or zero bias conditions. For a GaAs nipi, with $E_{geff}=1.40$ eV, a suitable laser energy is 1.39 eV.

Figure 6:
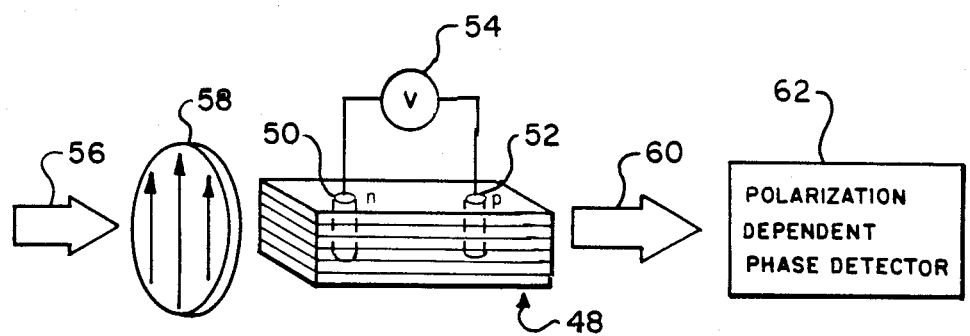
FIG. 6 is a simplified diagram of a phase modulated guided wave system employing the invention.

The invention also has applications to guided wave switching and modulation. A phase modulated guided wave system is illustrated in FIG. 6. In this system a nipi structure 48 similar to that of the previous embodiment is used but, instead of dividing it into pixels, two or more spaced wires 50, 52 extend down through the nipi layers. Wire 50 makes ohmic contacts with the n-doped layers and blocking contacts with the p-doped layers, while wire 52 makes ohmic contacts with the p-doped layers and blocking contacts with the n-doped layers. A voltage source 54 applies a voltage across the two wires, the voltage varying in accordance with the information which is to be transmitted. Thus, whereas in the previous embodiment the input information was contained in the spatial intensity pattern of the input beam, in the embodiment of FIG. 6 the input information is contained in the modulation by voltage source 54.

An input optical beam 56 is directed through a polarizing element 58, which is polarized parallel to an axis of symmetry for the nipi structure. This polarization orientation prevents the polarization of the beam from being rotated as it passes through the nipi structure, despite the difference in refractive index. Since laser beams are generally polarized to begin with, polarizer 58 represents the existing beam polarization. The polarized beam is directed into the edge of the nipi structure, generally parallel to the nipi layers. Variations in the voltage applied by source 54 produce corresponding variations in the refractive index of the nipi structure. This in turn varies the speed at which the input beam progresses through the nipi structure, and thus is transferred to the beam as a phase modulation. The output beam 60 from the nipi structure thereby has a phase modulation which corresponds to the voltage modulation from source 54. This modulation is observed by a polarization dependent phase detector 52. While not shown, it should be understood that the nipi structure 48 and the propagation channels for the beam could be contained within a waveguide enclosure.

Figure 7:
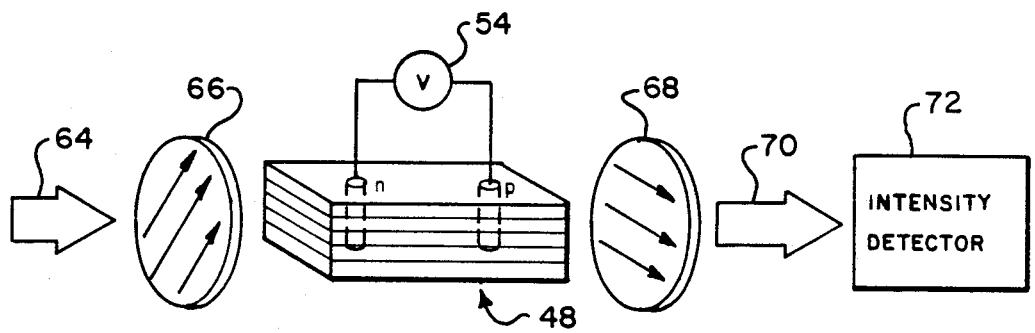
FIG. 7 is a simplified diagram of an amplitude modulated lated guided wavae system employing the invention.

Another form of guided wave system is illustrated in FIG. 7. This system imposes an amplitude modulation, rather than a phase modulation, upon an input beam 64 in response to a modulating signal from voltage source 54. The same nipi structure 48 is employed as in the previous embodiment, with the same connections to source 54. The input beam is transmitted through a polarizer 66, which is oriented at an angle to the nipi structure's axis of symmetry. Because of the anisotropic refractive index in the nipi structure, the polarization of the output beam will be rotated from that of the input beam. The output beam is transmitted through a second polarizer 68, which is crossed with respect to the input polarizer 66.

In general, the output beam will have polarization components parallel to both input polarizer 66 and output polarizer 68. The relative magnitude of the polarization component parallel to output polarizer 68 will vary with the degree by which the input beam polarization has been rotated, which is a function of the nipi anisotropic refractive index, that in turn being a function of the modulating voltage from source 54. Thus, the amount of light in the output beam 70 transmitted through output polarizer 68 reflects the voltage modulation applied to the nipi structure. This can be sensed by an optical intensity detector 72.

Figure 8:
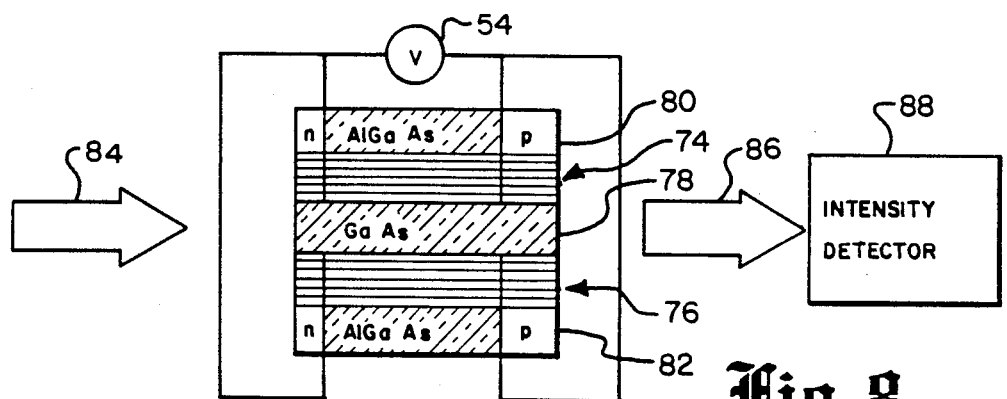
FIG. 8 is a simplified sectional view of another embodiment of an amplitude modulated guided wave system employing the invention.

A third guided wave application is illustrated in FIG. 8. This embodiment modifies a prior optical transmission technique in which a transmission medium is surrounded by a material having a different refractive index, and thereby prevents light from escaping the transmission medium. GaAs may be used as a transmission medium, and AlGaAs as the surrounding material. In accordance with the invention, nipi structures 74 and 76 are formed along opposite sides of the transmission medium 78. The nipi structures may be bounded on their other sides by layers 80, 82 of a material having a different refractive index from the optical transmission medium 78. Modulating voltage source 54 is connected in common to n- and p-connected wires of the two nipi structures, so that their refractive indices vary in tandem with the voltage modulation.

An input beam 84 is transmitted through medium 78, between the two nipi structures. As the applied voltage from source 54 is varied, the refractive indices of the two nipi structures will either approach or diverge from the refractive index for transmission medium 78, depending upon the direction of voltage variation. As the nipi structures' refractive index approaches that of transmission medium 78, only light which strikes the interface between the transmission medium and nipi structures at a very shallow angle will be reflected back into the transmission medium, due to the low refractive index differential. With this low differential, light from the transmission medium which strikes the interface at greater angles will continue on into the nipi structures, and be lost from the beam within the transmission medium. As the voltage from source 54 changes to move the nipi structure refractive indices further away from that of transmission medium 78, the critical angle for reflection back into the transmission medium will increase, and more light will be retained in the original beam within the transmission medium. Thus, the information contained in the signal from voltage source 54 is transferred onto the beam as an intensity modulation. The output beam 86 which exits the transmission medium is applied to an optical intensity detector 88, which senses its intensity modulation. Various applications for the modulation of a nipi structures' refractive index have thus been shown and described. Since numerous variations and additional applications will occur to those skilled in the art, it is intended that the invention be limited only in terms of the above claims.

We claim:

1. An optical refractive index modulator, comprising:
   a nipi structure comprising alternating n and p doped semiconductor layers divided into a spatial array of pixel elements,
   first and second arrays of contact means establishing respective ohmic contacts with the n and p layers within said pixel elements, and
   means for applying a set of spatially modulated voltages across said first and second arrays of contact means to spatially modulate the refractive indices of the nipi structure pixels.

2. The optical refractive index modulator of claim 1, said first and second arrays of contact means comprising respective arrays of contact elements extending through the nipi structure in alignment with their respective pixel elements and transverse to the n and p layers, each contact element being formed from a material that establishes ohmic contacts with its respective nipi layers and blocking contacts with the other layers.

3. An optical refractive index modulator, comprising:
   a nipi structure comprising alternating n and p doped semiconductor layers,
   first and second contact means establishing ohmic contacts with the n and p layers, respectively, said first and second contact means comprising respective contact elements extending through the nipi structure transverse to the n and p layers, each element being formed from a material that establishes ohmic contacts with its respective nipi layers and blocking contacts with the other layers, said first contact element comprising a ring enclosing aligned pixel portions of the nipi layers, and said second contact element comprising a wire extending through the nipi layers within the ring, and
   means for applying first and second voltages to the first and second contact means, respectively, the differential between the two voltages modulating the refractive index of the nipi structure.

4. The optical refractive index modulator of claim 3, further comprising a plurality of said rings forming a grid which divides the nipi structure into a matrix of pixels, and respective wires extending through the nipi layers within each ring, the voltage applying means adapted to apply a common voltage to the grid and spatially modulated voltages to the respective wires, whereby the nipi structure operates as a spatial phase modulator on an optical beam directed transverse to its layers.

5. The optical refractive index modulator of claim 3, said first and second contact elements comprising respective wires extending through the nipi layers.

6. The optical refractive index modulator of claim 5, wherein single wires contact each of the n layers and each of the p layers, respectively, whereby the nipi structure operates as a refractive index modulator to optical radiation directed parallel to its layers.

7. An optical spatial phase modulator, comprising:
   a nipi structure,
   means responsive to the spatial intensity pattern of an input optical beam for generating a corresponding spatial voltage pattern, and
   means for applying the spatial voltage pattern to the nipi structure to modulate the structure's spatial refractive index in accordance with the spatial voltage pattern, whereby the structure spatially phase modulates an applied readout beam in accordance with its spatial refractive index modulation.

8. The optical spatial phase modulator of claim 7, the nipi structure comprising alternating n and p doped semiconductor layers, and said means for applying the spatial voltage pattern comprising a conductive grid contacting and dividing the layers of one conductivity type into aligned pixel elements, discrete conductive contacts contacting the layers of opposite conductivity type within the boundaries of said pixel elements, means for applying a reference voltage level to said conductive grid, and means for applying the voltages at respective locations in the spatial voltage pattern to said discrete contacts.

9. The optical spatial phase modulator of claim 8, said grid extending through the nipi layers and formed from a material that establishes ohmic contacts with said layers of said one conductivity type and blocking contacts with said layers of opposite conductivity type, and said discrete conductive contacts comprising discrete wires extending through the nipi layers and formed from a material that establishes blocking contacts with said layers of said one conductivity type and ohmic contacts with said layers of opposite conductivity type.

10. An optical spatial phase modulator, comprising:
    a nipi structure comprising alternating n and p doped semiconductor layers,
    means for generating a spatial voltage pattern,
    a conductive grid contacting and dividing the layers of one conductivity type into aligned pixel elements, said grid extending through the nipi layers and formed from a material that establishes ohmic contacts with said layers of said one conductivity type and blocking contacts with said layers of opposite conductivity type,
    discrete conductive contacts contacting the layers of opposite conductivity type within the boundaries of said pixel elements, said discrete conductive contacts comprising discrete wires extending through the nipi layers and formed from a material that establishes blocking contacts with said layers of said one conductivity type and ohmic contacts with said layers of opposite conductivity type, said discrete contacts further comprising a conductive pad at one end of each wire adapted to receive an applied spatial voltage signal, and to reflect an applied readout beam from the nipi structure from a surface facing the wire,
    means for applying a reference voltage level to said conductive grid, and
    means for applying the voltages at respective locations in the spatial voltage pattern to said discrete contacts.

11. An optical refractive index modulator, comprising:
    a nipi structure comprising alternating n and p doped semiconductor layers, means for dividing said nipi structure into a spatial array of pixel elements, and means for applying a spatial array of modulated voltage differentials across adjacent pairs of n and p doped layers in a pattern corresponding to said spatial array of pixel elements to spatially modulate the nipi structure's refractive index, and thereby spatially modulate the phase of an optical beam applied to the nipi structure.

12. An optical spatial phase modulator, comprising:

a nipi structure comprising alternating n and p doped layers of semiconductor material, and adapted to receive a readout beam, a conductive grid extending through the nipi structure and dividing it into pixel elements, said grid forming ohmic contacts with the nipi layers of one conductivity type and blocking contacts with the nipi layers of opposite conductivity type, discrete conductive wires extending through the nipi structure within each pixel element, said wires forming ohmic contacts with the nipi layers of said opposite conductivity type and blocking contacts with the nipi layers of said one conductivity type, a layer of photoconductor material aligned with the nipi structure and adapted to receive an input optical beam having a spatial intensity pattern, means electrically connecting spatially separated portions of the photoconductor layer with aligned wires in the nipi structure, and a voltage source connected to apply a voltage between the conductive grid and the input beam side of the photoconductor layer, the voltage source, photoconductor layer and electrically conductive means converting the optical spatial intensity pattern of an input beam to a spatial voltage pattern applied to the nipi wires, and the spatial voltage pattern between the nipi wires and the grid establishing a spatial refractive index modulation in the nipi structure which is transferred as a spatial phase modulation to a readout beam.

13. The optical spatial phase modulator of claim 12, said electrical connecting means including, for each wire, a contact pad at one end of the wire adapted to receive a voltage signal from a respective portion of the photoconductor layer on one surface, and to reflect an applied readout beam from the nipi structure from a surface of the pad facing the wire.

14. The optical spatial phase modulator of claim 13, said electrical connecting means further comprising, for each contact pad, an aligned metallic pad on the adjacent face of the photoconductor layer, and a metallic projection from said photoconductor pad which contacts the corresponding contact pad, said photoconductor pads and semiconductor extensions comprising Schottky contacts.

15. The optical spatial phase modulator of claim 12, said layer of photoconductor material including an avalanche layer for amplifying the spatial voltage pattern.

16. The optical spatial modulator of claim 12, wherein the conductive grid is grounded.

17. A method of modulating an optical beam, comprising:

transmitting the beam through a nipi structure having alternating n and p doped semiconductor layers, applying a spatial voltage modulation between the n and p doped layers in a pixel array pattern to spatially modulate the nipi structure's refractive index, according to said pixel array pattern and said spatially modulated refractive index.

18. The method of claim 17, wherein the beam is transmitted through the nipi structure generally transverse to the n and p layers, and individual voltage differentials are applied to aligned pixel elements of the layers to spatially phase modulate the beam.

19. The method of claim 18, wherein a common first voltage is applied to the nipi layers of one conductivity type surrounding each pixel element, and spatially modulated voltages are applied to the layers of opposite conductivity type within each pixel element.

20. The method of claim 17, wherein the beam is transmitted through the nipi structure generally parallel to the n and p layers, and a common voltage differential is applied across the n and p layers to modulate the refractive index of the nipi structure.

21. A method of converting an optical spatial intensity modulation to an optical spatial phase modulation, comprising:

converting the optical spatial intensity modulation to a spatial voltage modulation, applying the voltage modulation to a nipi structure to spatially modulate the refractive index thereof, and directing a readout beam through the nipi structure to receive a spatial phase modulation corresponding to the refractive index modulation.

22. The method of claim 21, wherein the readout beam comprises a laser beam having a lesser energy level than the effective bandgap energy of the nipi structure.

23. The method of claim 21, wherein the nipi structure comprises alternating layers of n and p doped semiconductor material, the voltage modulation is applied to the layers of one conductivity type, and a reference voltage is applied to the layers of the opposite conductivity type.

24. The method of claim 23, wherein the n and p doped layers are divided into aligned pixel elements corresponding to the spatial voltage modulation, a discrete modulated voltage signal is applied to each set of aligned pixel elements for the layers of one conductivity type, and a common reference voltage is applied to the pixel elements for the layers of the opposite conductivity type.

* * * * *